United States Patent [19]
DiMaio et al.

[11] Patent Number: 5,236,505
[45] Date of Patent: Aug. 17, 1993

[54] APPARATUS AND METHOD FOR APPLYING LIQUID MATERIAL TO A FASTENER

[75] Inventors: Anthony F. DiMaio, West Danville, Vt.; Robert E. Meadows, Chicago, Ill.

[73] Assignee: Nylok Fastener Corporation, Rochester, Mich.

[21] Appl. No.: 737,460

[22] Filed: Jul. 29, 1991

[51] Int. Cl.⁵ ............................................. B05C 3/00
[52] U.S. Cl. .................................. 118/410; 118/429
[58] Field of Search ............... 118/401, 410, 416, 429; 228/37, 43

[56] References Cited
U.S. PATENT DOCUMENTS

| | | | |
|---|---|---|---|
| 3,004,505 | 10/1961 | Dvorak | 118/429 |
| 3,216,642 | 11/1965 | De Verter | 118/429 |
| 3,341,354 | 9/1967 | Woods et al. | |
| 3,383,054 | 5/1968 | Nugarus | |
| 3,927,409 | 12/1975 | Kase et al. | 118/429 |
| 3,972,631 | 8/1976 | Huber | 401/261 |
| 4,667,879 | 5/1987 | Muller | 239/133 |

Primary Examiner—W. Gary Jones
Assistant Examiner—Brenda Lamb
Attorney, Agent, or Firm—Niro, Scavone, Haller & Niro

[57] ABSTRACT

An adjustable nozzle applicator and method for the application of liquid to a surface including a main nozzle member and an insert nozzle portion positioned therein. The bottom floor of the main nozzle member is configured to form a trough for channeling and directing the liquid. The insert portion encloses part of the trough and is disposed adjacent but not touching a wall of the main nozzle member to create an output aperture port. At the output aperture port, the liquid exits the aperture in a fashion resembling a waterfall without the use of any input pressure. Such a gentle waterfall flow of liquid is particularly useful for the application of liquids that are delicate in nature. Overflow liquid exits through the floor of the applicator. The width of the waterfall at the output may be varied by adjustment of the distance between the main nozzle member and the insert portion for precise control of the flow and application of the liquid.

11 Claims, 2 Drawing Sheets

APPARATUS AND METHOD FOR APPLYING LIQUID MATERIAL TO A FASTENER

BACKGROUND OF THE INVENTION

This invention relates generally to a liquid applicator and more particularly to an apparatus and method for precision application of liquid containing microencapsulated beads of adhesive to a fastener.

In general, it is desirable to apply liquid to a surface. More specifically, it is desirable to affix a patch of adhesive to a fastener, such as a threaded screw. When a screw with a patch containing beads of adhesive engages with matching threads, such as on a nut, the adhesive will be released from the microencapsulated beads or a mixture will occur causing an adhesive to form to secure the screw and nut together forming a fastener arrangement resistent to vibration and other means that may cause disengagement. Various sized patches of adhesive may be used depending on the desired use and applications.

The application of liquid, and especially adhesive, to threads creates a special problem in that precision application of the liquid is required. Too much or too little liquid on the threads will generate a defective patch. Also, precise patch area or coverage is of concern when applying an adhesive patch to a fastener. If a patch strays beyond the desired predetermined area, it will cause problems with the use of that fastener when installed in its intended application. With the use of liquid with microencapsulated beads of adhesive, it is critical not to use excessive pressure in the application of the liquid because of the danger that the microencapsulated beads of adhesive will burst and render the patch unusable. Overall, if the liquid is not gently and precisely applied to the fastener according to the desired specifications to form a patch, the entire fastener will be unusable thereby unnecessarily increasing production and processing costs.

In the past, prior art liquid applicators have been used for the application of various types of liquids to various types of surfaces. The prior art applicators employ various means for controlling and directing the flow of liquid onto the desired surface. To control the flow of liquid, prior art applicators have changed the size of its outlet port to control the flow of the liquid as well as changed the pressure through the applicator to in turn vary the output flow of the liquid from the applicator onto the desired surface. Examples of such prior art liquid applicators are described in detail in U.S. Pat. Nos. 3,972,631, 3,341,354, 3,383,054, and 4,667,879.

The devices for flow control of the prior art applicators are poorly suited for the delicate application of liquid adhesive to a fastener. Most prior art applicators use pressure to force the liquid through the applicator. None of these apparatuses take into account the delicate nature of the liquid. As a result, application under such pressure would burst the microencapsulated beads and prematurely release the adhesive. Prior art applicators that spray the liquid onto the desired surface are similarly ill-suited for fasteners. Undesirable overspray causes the patch to be unusable for its intended purposes. Prior art liquid applicators and methods for applying liquid to fasteners do not serve the specific needs for the precise and controlled application of a liquid having microencapsulated portions to form an acceptable patch on a fastener.

SUMMARY OF THE INVENTION

The present invention preserves the advantages of prior art liquid applicators while providing new advantages not found in currently available liquid applicators. Furthermore, the present invention overcomes many of the disadvantages of such currently available applicators.

This invention relates to an apparatus for the application of liquid to a surface. The applicator of the present invention also provides, more specifically, for the delicate, precise and controlled application of liquid adhesive to a fastener without the danger of microencapsulated bead breakage or resultant malformed and unusable patches.

The invention is used in conjunction with a machine that supplies the fasteners to be processed. Typically, the threads of the fasteners are the surfaces on which the liquid is to be applied, although other areas of a fastener may be coated by the present invention. The applicator of the present invention is situated so that the fastener threads to be processed and coated are passed directly thereover. The application of the liquid with adhesive beads can be applied to fasteners passing over in continuous fashion without stopping the supply of fasteners to be coated over the applicator.

The applicator of the present invention includes a main nozzle body with a floor, which may be a stepped floor, that creates a trough for the transport and direction of the liquid flowing therethrough. An insert portion of the applicator is provided that fits within the main nozzle portion in adjustable fashion. As a result, an adjustable aperture is formed creating an inlet receptacle port and an outlet port where the liquid exits the applicator.

Liquid enters and fills the receptacle created between the main nozzle body and the insert portion and travels up through the adjustable output aperture. The liquid first flows in a downward direction, then laterally through the trough area, then in an upward direction through the output aperture. The inlet receptacle is maintained in a fully filled or topped off condition at all times for purposes of continuously processing the fasteners. Since the top of the receptacle is at a height higher than that of the output aperture, liquid will tend to flow out of the output aperture due to the lack of equilibrium of pressure and volume present in the system. Once the liquid exits the aperture, it overflows generating a waterfall effect over the edge of the output aperture.

Due to the flow path of the liquid, the present invention can gently and precisely apply liquid with delicate adhesive beads to a surface without the use of additional, undesirable pressure. Another advantage is the ability to precisely adjust the output aperture allowing for precise control of the width of the liquid flowing from the applicator. As a result, patches having areas and thicknesses of greater precision can be achieved with the present invention.

Accordingly, an object of the invention is to provide a liquid applicator and method which allows for the precise and controlled application of a liquid to a surface.

An additional object of the present invention is to provide a liquid applicator which allows for the application of a liquid containing delicate micro-encapsulated beads of adhesive to a fastener without the beads bursting.

A further object of the invention is to provide a liquid applicator which allows for adjustability and control of the output of the liquid onto to a fastener.

Another object of the present invention is to provide a liquid applicator which uses only ambient pressure or gravity to create liquid flow for application onto a fastener.

Other advantages of the present invention will become apparent from the drawings, detailed description and claims which follow:

BRIEF DESCRIPTION OF THE DRAWINGS

The novel features of this invention are set forth with particularity in the appended claims. The invention, together with its objects and advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
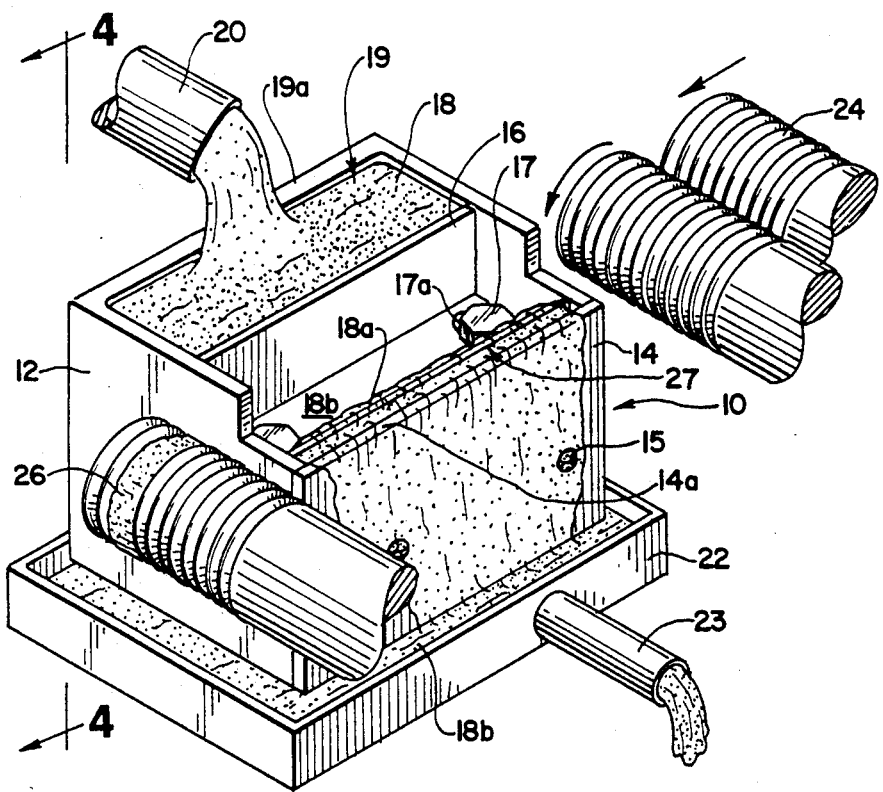
FIG. 1 is a perspective view of the preferred embodiment of the liquid applicator of the present invention in operation.

FIG. 1 shows the preferred embodiment of the present invention in its environment of operation. It is shown that liquid 18, applied to a surface by applicator 10, is fed into receptacle area 19 via feed line 20. Liquid 18 travels below insert 16 and then exits through output aperture 27 in a gentle waterfall-like fashion. It may be appreciated by those skilled in the art that a variety of fasteners may be coated by the applicator of the present invention including by not limited to nuts, bolts, screws, male fasteners, female fasteners, inserts and the like. For purposes of this application, this detailed description will use fastener 24 as a typical example throughout. Fasteners 24 are passed over output aperture 27 in a rolling or rotating fashion so that they may be in contact with liquid 18a exiting output aperture 27. One full rotation of one of fasteners 24 is all that is necessary to apply liquid 18a 360 degrees around the circumference of the fastener of the precise width of output aperture 27. The width of output aperture 27 will create a corresponding patch of substantially the same width on fasteners 24 without any application on undesirable locations.

Excess liquid 18b flows back within the cavity formed by insert 16 and exits the applicator through holes 17a which run completely through the applicator in a vertical direction. Excess liquid 18b exits the applicator 10 and empties into catch basin 22. Excess liquid 18b is then further removed from the applicator 10 by hose 23 which directs liquid 18b into a storage container or the like. Such excess liquid 18b may be recirculated through feed line 20 to be used again within the applicator.

Figure 2:
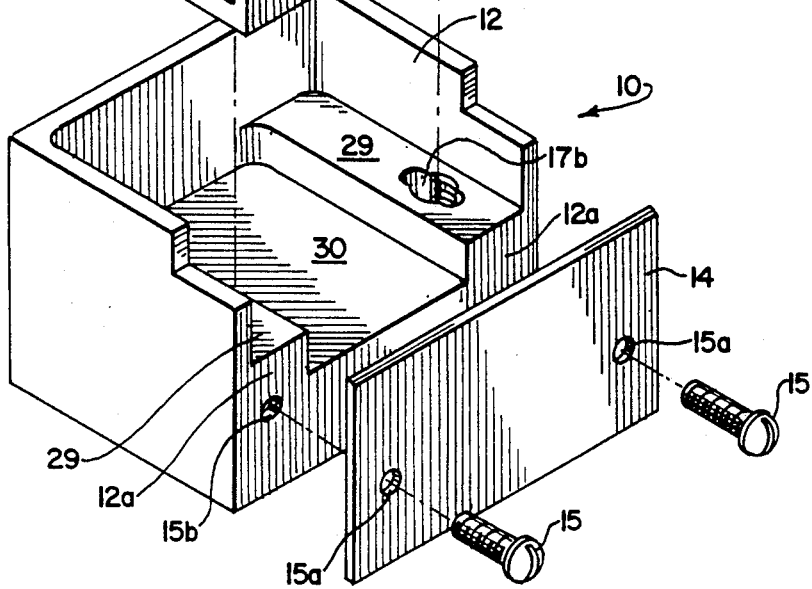
FIG. 2 is an exploded perspective view of the invention showing its internal structure.
Figure 3:
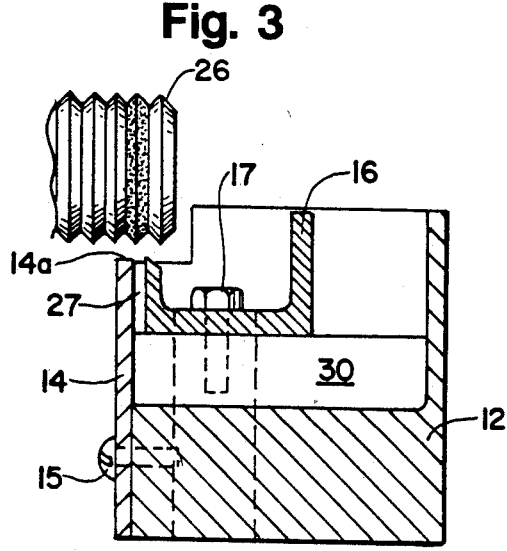
FIG. 3 is a cross-sectional view of FIG. 1 through the center of the applicator.

Turning to FIG. 2, an exploded view of the preferred embodiment shows the liquid applicator 10 of the present invention having a main nozzle body 12 with front plate 14 affixed to its front side 12a by screws 15 which protrude through apertures 15a. Screws 15 engage with receiving threads formed around the periphery of apertures 15b to secure front plate 14. The main nozzle body 12 and the front plate 14 together form the outer shell of the of the applicator 10. Insert 16 is positioned within this outer shell arrangement. Insert 16 is in contact with ledge 29 of the main nozzle body 12 created by trough 30. Insert 16 is secured to main nozzle body 12 by screws 17 through apertures 17a. Threads of screws 17 engage with receiving threads on the inside of apertures 17b to secure insert 16 onto ledge 29. Alternatively, holes 17b may not be threaded. In such an embodiment, screws 17 may pass directly through both sets of holes 17a and 17b and engage with receiving threads of a separate support means, such as a shelf.

Apertures 17a are specifically designed to be oval in shape so that insert 16 may be moved forward and backward and then adjusted before tightening screws 17. Due to the adjustability of insert 16, output aperture 27, between front plate 14 and wall 16c of insert 16, may be controlled with accuracy. As a result of the adjustability of output aperture 27, the width of the liquid stream and the amount of liquid 18 flowing from output aperture 27 may be accurately and very precisely controlled.

As can be seen by FIG. 2, the floor of main nozzle body 12 is constructed as a stepped structure to form a trough 30 for flow direction of liquid 18. The liquid flows from receptacle 19 through trough 30 underneath insert 16 and then up through aperture 27 between front plate 14 and wall 16c of insert 16. This flow path of liquid 18 through the applicator may be clearly seen in FIG. 4.

Figure 4:
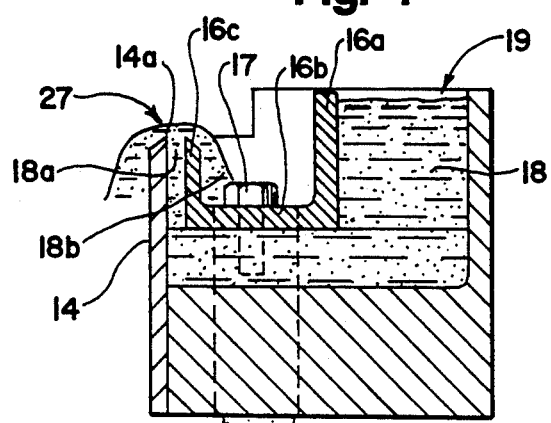
FIG. 4 is a cross-sectional view of the liquid applicator of the present invention taken generally through the line 3—3 of FIG. 1 showing the flow path of liquid through the applicator.

In FIG. 4, the flow path of liquid 18 throughout the applicator is shown. Liquid 18 exits from aperture 27 in a waterfall-like fashion. When fasteners 24 pass over applicator 10 in the region of aperture 27, they will come into contact with liquid 18a that is exposed just above the mouth of aperture 27. Once liquid overflows from region 18a, this excess liquid 18b either flows through apertures 17a or over front plate 14. In either case, this excess liquid 18b completely exits the entire applicator and may then enter catch trough 22.

The flow path of liquid 18 through the applicator is essential to achieving its objective of gentle and precisely controlled application. In particular, the applicator 10 of the present invention does not use the assistance of any external pressure. It merely uses the force of gravity (ambient pressure) to assist the flow of liquid. To ensure that the flow liquid is gentle, under only ambient pressure, thereby preventing the microencapsulated adhesive beads in liquid 18 from prematurely breaking, the novel flow path of the present invention is employed.

The liquid 18 first flows in a downward direction with the force of gravity. Liquid 18 then flows in a lateral direction in the area of trough 30. Finally, liquid 18 flows in an upward direction against the force of gravity. Since the top edge 19a of receptacle 19, which is always maintained completely full, is at a height greater than the top edge 14a of output aperture 27, a lack of equilibrium will occur. Due to the laws of physics relating to the pressure and volume in a system, the two levels of liquid within the same system will seek to become equal or in equilibrium. If the difference between two heights in a fluid system is great, then liquid will flow from the lower side at an increased rate to achieve equilibrium. Since the difference in the in the respective heights in the present invention is relatively small, a slow and gentle flow will result out of the end with the lower height, namely output aperture 27.

The waterfall flow of the present invention is critical to achieving proper application of liquid with microencapsulated adhesive to a fastener such as a screw, insert or the like. Any other means, such as spraying, would be unacceptable for applying a proper, precise coating of liquid to the threads or other predetermined location on a fastener.

Figure 5A:
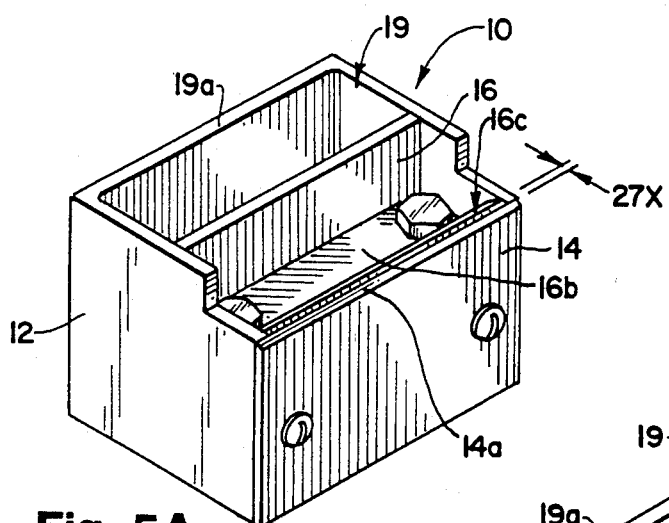
FIG. 5A is a perspective view of the liquid applicator of the present invention where the width of the aperture of the output port is narrow.
Figure 5B:
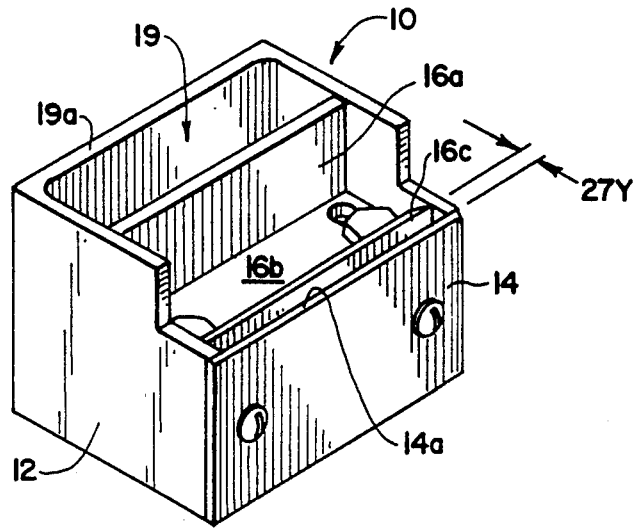
FIG. 5B is a perspective view of the liquid applicator of the present invention where the aperture of the output port has been adjusted to be wider than that shown in FIG. 5A.

Another advantageous feature of the present invention is shown in FIGS. 5A and 5B. A novel feature of applicator 10 of the present invention is the ability to accurately control the flow of liquid 18 out of output aperture 27 over top edge 14a. This is accomplished by the adjustability of insert 16 positioned on ledges 29. Since insert 16 is slidably adjustable along ledges 29 and can be secured anywhere along ledges 29 by screws 17, the aperture created between wall 16c of insert 16 and front plate 14 can be precisely varied.

In FIG. 5A, an applicator 10 is shown with insert 16 disposed within main nozzle body 12 and front plate 14. Insert 16 is secured down onto ledges 29 so that aperture 27x is quite small allowing for a narrow application of liquid 18 onto fasteners 24. In the illustrated embodiment, the resultant application of liquid on the fasteners 24 will be a thin 360 degree coating of liquid around the threads of the fastener as shown in FIG. 1. Alternatively, insert 16 may be screwed down to ledges 29 so that aperture 27y, as in FIG. 5B, is quite large and considerably wider than aperture 27x allowing for a wider application of liquid onto fasteners 24. The resultant application of liquid on the threads of the fastener with an adjustment as shown in FIG. 5B will be a wider 360 degree coating of liquid around the threads of the fastener. The width of liquid application is adjustable according to the desired application.

The present applicator is employed as part of an entire system. As shown in FIG. 1, the applicator applies liquid to the portion of the fastener passing over output aperture 27. First, the applicator must be adjusted according to the desired application. If a wide liquid application covering several threads is required, aperture 27 will be adjusted to be wide. If a narrow patch is required covering only a single or half of a thread, a narrow aperture 27 will be used.

Once the applicator is secured in place, liquid 18 may be fed into receptacle 19. Within a few seconds, liquid will begin to fall by gravity over edge 14a and through output aperture 27 into holes 17a. At this point, a conveyor system or the like may be activated to continuously pass fasteners over aperture 27. Once the liquid is applied in desired fashion, the fastener may then be moved away from the applicator to an area for curing the liquid on the fasteners, if required. The result is a precise application of liquid on a predetermined portion of the fastener. The present invention may be employed in a wide array of uses that specifically require gentle application of liquid. The invention may be used to apply non-adhesive liquid and may also be used to apply liquid to surfaces that are without threads.

It should be understood that various changes and modifications to the preferred embodiments described herein will be apparent to those skilled in the art. Such changes and modifications can be made to the illustrated embodiments without departing from the spirit and scope of the present invention, and without diminishing any attendant advantages of the present invention. It is, therefore, intended that such changes and modifications be covered by the following claims.

What is claimed is:

1. An adjustable nozzle for the application of liquid to a receiving surface, comprising:
    a main nozzle body having a cavity creating a trough for containing said liquid;
    an insert nozzle portion disposed within and in adjustable communication with said main nozzle body to create an inlet port and an outlet port with an adjustable aperture therebetween to adjustably control the flow of said liquid through said inlet port and said outlet port and to thereby control the application of said liquid onto said receiving surface; and
    means for delivering said liquid to said inlet port under the force of gravity.

2. The adjustable nozzle of claim 1, further comprising:
    means for securing said insert nozzle portion within and in communication with said main nozzle body.

3. The adjustable nozzle of claim 1, further comprising:
    means for collecting any said liquid that exits said outlet port and is not applied to said receiving surface.

4. The adjustable nozzle of claim 1, wherein said liquid is directed through said trough in a lateral direction.

5. The adjustable nozzle of claim 1, wherein said liquid enters said inlet port in a vertical direction with the force of gravity and said liquid exits said output port in a vertical direction against the force of gravity.

6. The adjustable nozzle of claim 5, wherein said liquid exiting said output port overflows over said output port in a waterfall-like fashion.

7. The adjustable nozzle of claim 1, wherein said main nozzle body includes a stepped floor surface which supports said insert nozzle portion to create a closed lateral passageway for said liquid between said inlet port and said outlet port.

8. The adjustable nozzle of claim 7, wherein said liquid flows in a lateral direction through said passageway below said insert nozzle portion.

9. An adjustable nozzle for the application of liquid containing an adhesive to a threaded fastener, comprising:
    a main nozzle body including a floor, a trough in said floor for accepting and directing flow of said liquid;
    two ledges created by said trough and disposed on opposing sides of said trough;
    an insert portion having a cross-section generally in the shape of a "U" with a first vertical side of its U shape being of lesser height than a second vertical side and a third horizontal side disposed on said ledges and in adjustable communication with said main nozzle body creating an adjustable aperture between said first vertical side and first wall of said main nozzle body to adjustable control the flow of said liquid therethrough; and means for maintaining a desired aperture width during application of said liquid.

10. The adjustable nozzle of claim 9, further comprising:

an output port created between said first wall of said main nozzle body and said first vertical side; and an input port created between said second vertical side and a second wall of said main nozzle body;

whereby liquid to be applied is fed into said input port and subsequently exists said output port onto said threaded fastener.

11. The adjustable nozzle of claim 9, further comprising:

at least one overflow port disposed through said third horizontal side and said floor of said main nozzle body for directing liquid overflowing from said output port and not applied to a fastener; and a catch basin for collecting liquid directed through said overflow port.

* * * * *